(12) United States Patent
Yamazoe

(10) Patent No.: US 6,593,718 B1
(45) Date of Patent: Jul. 15, 2003

(54) HORIZONTAL MULTI-JOINT INDUSTRIAL ROBOT

(75) Inventor: Katsuhiro Yamazoe, Okayama (JP)

(73) Assignee: Tazmo Co., Ltd., Okayama (JP)

( * ) Notice: Subject to any disclaimer, the term of this patent is extended or adjusted under 35 U.S.C. 154(b) by 0 days.

(21) Appl. No.: 09/657,791

(22) Filed: Sep. 8, 2000

(30) Foreign Application Priority Data

Sep. 28, 1999 (JP) .......................................... 11-274738

(51) Int. Cl.[7] .............................. B25J 9/18; G05B 19/19
(52) U.S. Cl. ................................................. 318/568.11
(58) Field of Search ....................... 318/568.11–568.25; 414/730–744.5

(56) References Cited

U.S. PATENT DOCUMENTS

| | | | |
|---|---|---|---|
| 5,049,029 A | * | 9/1991 | Mitsui et al. |
| 5,443,354 A | | 8/1995 | Stone et al. |
| 5,525,027 A | | 6/1996 | Jinno et al. |
| 5,534,761 A | * | 7/1996 | Crippa ............... 318/568.11 X |
| 5,640,883 A | * | 6/1997 | Takizawa |
| 5,789,890 A | | 8/1998 | Genov et al. |
| 5,857,826 A | * | 1/1999 | Sato et al. |
| 6,121,743 A | | 9/2000 | Genov et al. |
| 6,199,444 B1 | * | 3/2001 | Wakaizumi et al. |

FOREIGN PATENT DOCUMENTS

| | | |
|---|---|---|
| JP | 8-274140 | 10/1996 |
| JP | 9-285982 | 11/1997 |

* cited by examiner

Primary Examiner—Jeffrey Donels
(74) Attorney, Agent, or Firm—Jordan and Hamburg LLP

(57) ABSTRACT

A horizontal multi-joint industrial robot has a construction in which rotational driving force is transmitted from rotational driving sources placed in a base through driving force transmitting mechanism placed in arms and connecting parts to each of arms and a robot hand. This construction in which rotational driving sources for arms and robot hand are placed concentratively in the base, eliminates the need for routing electric lines in moving parts, thereby preventing rotational movements of the arms and robot hand from decreasing the reliability, and besides allowing inertial moments to reduce by decreasing weights of the moving parts.

13 Claims, 3 Drawing Sheets

HORIZONTAL MULTI-JOINT INDUSTRIAL ROBOT

BACKGROUND OF THE INVENTION

This invention relates generally to a horizontal multi-joint robot that is employed for conveying a wafer in a semi-conductor producing factory, and especially relates to an art for placing rotational driving sources concentratively in one place, thereby avoiding routing energy supplying means to the rotational driving sources, such as electric wires for power supply, and arrangements of oil hydraulic or pneumatic pipes, and to an art for reducing weights of moving parts.

Concerning a conventional horizontal multi-joint robot known as a scholar type, as shown in FIG. 5, a robot 100 has a construction wherein connecting parts 101 and 102 corresponding to joints of arms 103 and 104 with multi degrees of freedom, are equipped with arm rotational driving sources 105 and 106 that respectively drive the arms 103 and 104, and the arm 104 is equipped in its distal end with a robot hand rotational driving source 107 in addition to driving sources 105 and 106.

However, in the above-mentioned construction, it is needed to supply energy to the connecting parts between arms 103 and 104, and to distal end of the arm 104, for activating the arm rotational driving sources 105 and 106, and robot hand rotational driving source 107. For example, if each of the driving sources is a motor, it is necessary to connect an electric wire to each of the driving sources and if each of the driving sources is an oil hydraulic or air pressure motor, it is necessary to place the pipe arrangements for supplying pressed oil or air. Rotational movements of the arms and robot hand gives mechanical load to these electric wires and pipe arrangements, thereby reducing its own reliability. Further, placing the rotational driving sources in each of the arms increases weights of the moving parts, thereby increasing inertial moments of the moving parts, and decreasing transportable weights thereof.

SUMMARY OF THE INVENTION

This invention is made to solve the above-mentioned problems. One object of the present invention is to provide a horizontal multi-joint robot wherein rotational driving sources for arms and a robot hand are placed concentratively in a base member in order to eliminate the need for routing energy-supplying electric wires and pipe arrangements, thereby preventing rotational movements of the arms and robot hand from decreasing the reliability, and wherein inertial moments can be reduced by decreasing weights of moving parts.

In order to achieve the above-mentioned object, according to one aspect of the present invention, there is provided a horizontal multi-joint industrial robot in which plural arms are sequentially pivotally attached, a proximal end portion of the lowest arm is rotatably supported by a base, and a robot hand is rotatably supported by a distal end portion of the highest arm: wherein a rotational driving source for driving said arms and robot hand to rotate is contained in said base; and wherein a driving force transmitting mechanism for transmitting rotational driving force from said rotational driving source to each of the arms and robot hand is provided in each of the arms and connecting parts of the arms.

In the above-described composition, not limited to an electric motor, an oil hydraulic motor or a pneumatic motor can be employed as said rotational driving source. Besides, one driving source for arm rotation can drive at least two arms to rotate. Further, it is possible to locate the arm rotational driving source and robot hand rotational driving source separately.

Further, in the above described-composition, the rotational driving source which is contained in the base member rotates plural arms and a robot hand through the driving force transmitting mechanism which is provided in each of the arms and connecting parts. This composition eliminates the need for routing energy-supplying electric wires and pipe arrangements, and prevents a break or a damage of the wire caused by an increase of mechanical load due to the rotation of the arms and robot hand. Further, this composition makes it possible to reduce weights of the arms, which decreases inertial moments, thereby allowing transportable weights to be increased, and motion speed of the robot to become faster.

In the above-mentioned horizontal multi-joint industrial robot, said driving force transmitting mechanism includes a rotational mechanism for rotating said robot hand around the connecting part of the distal end portion of the highest arm.

Further, in the above-mentioned horizontal multi-joint industrial robot, said driving force transmitting mechanism includes a mechanism for supporting said robot hand so as to move in a seesaw manner in the distal end portion of the highest arm, and giving tilting motions to said robot hand. This composition allows the robot hand to move in an up-and-down direction, thereby enhancing workability.

Further, in the above-mentioned horizontal multi-joint industrial robot, said driving force transmitting mechanism includes a mechanism for supporting said robot hand so as to rotationally move around a horizontal axis in the distal end portion of the highest arm, and giving rotational movements around the horizontal axis to said robot hand. This composition allows the robot hand to rotate around the horizontal axis, thereby enhancing workability.

Furthermore, in the above-mentioned horizontal multi-joint industrial robot, said arms are sequentially attached from the base in order of first, second and third arms; wherein said rotational driving source comprises: an arm rotation motor for rotating said first and third arms; an arm extension motor for rotating said second arm; and a robot hand rotation motor for rotating said robot hand; and wherein said driving force transmitting mechanism includes a mechanism that said arm rotation motor drives first and third arms to rotate, and said arm extension motor drives said second arm to rotate. This composition allows one driving source for arm rotation to drive at least two arms to rotate, thereby making it possible to decrease the number of rotational driving sources.

Furthermore, in the horizontal multi-joint industrial robot, wherein said driving force transmitting mechanism comprises axes passing through each of the connecting parts of said arms, pulleys that are fixed on said axes, and belts that are looped between pulleys of proximal end portions and distal end portions of the arms. The composition that the pulleys and belts are employed in the driving force transmitting mechanism, suppresses noise and dust raising under operating conditions. Therefore, this is suitable for use in a semi-conductor factory.

DETAILED DESCRIPTION OF THE PREFERRED EMBODIMENT OF THE PRESENT INVENTION

Figure 1:
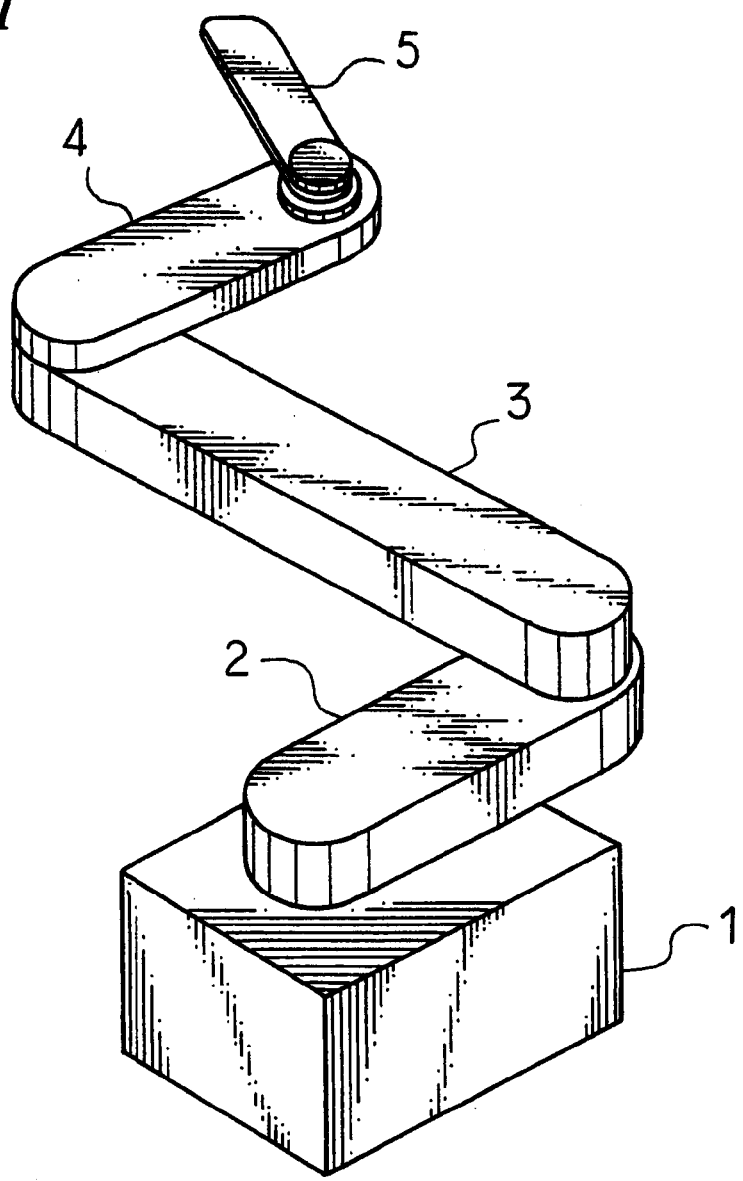
FIG. 1 is an external view of a horizontal multi-joint robot according to one embodiment of the present invention.
Figure 2:
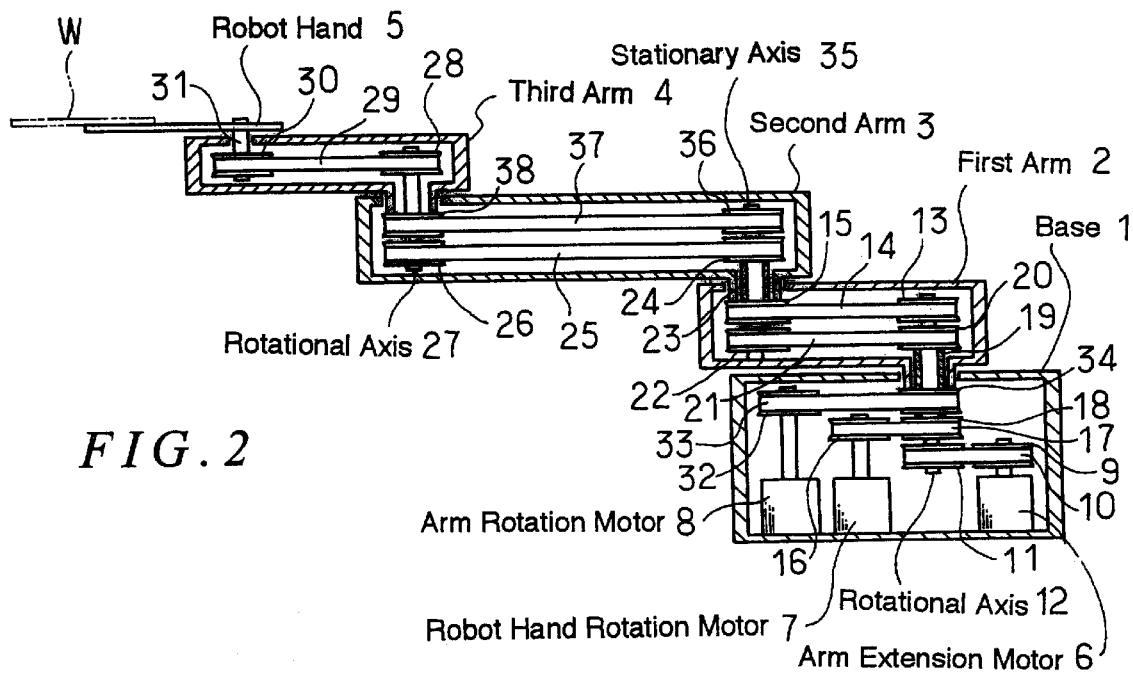
FIG. 2 is a side-sectional view of a robot according to a first embodiment of the present invention.

Now, referring to the drawings, a horizontal multi-joint industrial robot equipped with three degrees of freedom according to one embodiment of the present invention will be explained. FIG. 1 is an external view of a robot according to the first embodiment of the present invention, and FIG. 2 is a side sectional view of said robot. The robot includes a base 1, and includes a first arm 2, a second arm 3 and a third arm 4 that are sequentially pivotally attached, and mounted to said base 1. The first arm 2 has a proximal end portion that is rotatably mounted on the base 1, and a robot hand 5 for holding a wafer W is rotatably mounted on a distal end portion of the third arm 4. The base 1 contains an arm rotation motor 8 that drives the first and third arms 2 and 4 to rotate, an arm extension motor 6 that drives the second arm 3 to rotate, and a robot hand rotation motor 7 that drives the robot hand 5 to rotate.

The arm rotation motor 8 rotates the first and third arms 2 and 4 through a driving force transmitting mechanism for arm rotation. The arm extension motor 6 rotates the second arm 3 through a driving force transmitting mechanism for arm extension. The robot hand rotation motor 7 rotates the robot hand 5 through a driving force transmitting mechanism for robot hand rotation.

The driving force transmitting mechanism for arm rotation comprises a pulley 32, a pulley 34, a belt 33, a pulley 36, a pulley 38, and a belt 37. The pulley 32 is fixed on an output axis of the arm rotation motor 8. The pulley 34 is fixed on the proximal end portion of the first arm 2. The belt 33 is looped between said pulleys 32 and 34. The pulley 36 is fixed on a distal end portion of the first arm 2, and fixed on an upper section of a stationary axis 35 that is toward an inside of the second arm 3 through a connecting part between the first and second arms 2 and 3. The pulley 38 is fixed on a proximal end portion of the third arm 4. The belt 37 is looped between the pulleys 36 and 38.

The driving force transmitting mechanism for arm extension comprises pulleys 9, 13, 11 and 15, and belts 10 and 14. The pulley 9 is fixed on the output axis of the arm extension motor 6. The pulleys 13 and 11, which pass through the proximal end portion of the first arm 1, are respectively fixed on upper and lower ends of a rotational axis 12 that is rotatably supported by said proximal end portion. The pulley 15 is fixed on the proximal end portion of the second arm 3. The belt 10 is looped between the pulleys 9 and 11, and the belt 14 is looped between the pulleys 13 and 15.

The driving force transmitting mechanism for robot hand rotation comprises pulleys 16, 20, 18, 36, 22, 28, 26 and 30, a robot hand 5, and belts 17, 21, 25 and 29. The pulley 16 is fixed on the output axis of the robot hand rotation motor 7. The pulleys 20 and 18, which pass through the proximal end portion of the first arm 2, are respectively fixed on upper and lower ends of a drum 19 that is rotatably supported by said proximal end portion. The pulleys 36 and 22 are respectively fixed on upper and lower ends of a drum 23 that is rotatably supported by the stationary axis 35. The pulleys 28 and 26 are respectively fixed on upper and lower ends of a rotational axis 27 that is rotatably supported by the proximal end portion of the third arm 4. The pulley 30 is fixed on a lower end of a rotational axis 31 that is rotationaly supported by an end of the third arm 4. The robot hand 5 is fixed on an upper end of a rotational axis 31. The belt 17 is looped between the pulleys 16 and 18, the belt 21 between the pulleys 20 and 22, the belt 25 between the pulleys 24 and 26, and the belt 29 between the pulleys 28 and 30.

The explanation is nextly given to actions of the above-described composition. The rotational driving force from the arm rotation motor 8 in the base 1 is transmitted to the first arm 2 that is fixed to the pulley 34 connected with the pulley 32 fixed on the output axis of the arm rotation motor 8 through the belt 33, thereby rotating the first arm 2. Then, said driving force is transmitted to the third arm 4 that is fixed to the pulley 38 diameter of which has a ratio of 1:1 to that of the pulley 36, through the stationary axis 35 that is fixed to the first arm 2, the pulley 36 that is fixed on said axis 35, and the belt 37, thereby rotating the third arm 4. Accordingly, the third arm 4 is connected to the first arm 2 at a ratio of 1:1, so that the third and first arms 4 and 2 always rotate in a same direction.

The rotational driving force from the arm extension motor 6 in the base 1 is transmitted to the pulleys 11 and 13 that are fixed on the rotational axis 12, through the pulley 9 fixed on the output axis of said motor 6 and through the belt 10, and then transmitted to the second arm 3 fixed to the pulley 15, through the pulley 13 and the belt 14, thereby rotating the second arm 3.

The rotational driving force from the robot hand rotation motor 7 in the base 1 is transmitted to the pulleys 18 and 20 that are fixed on the rotational drum 19, through the pulley 16 fixed on the output axis of said motor 7 and through belt 17. The pulley 20 transmits the driving force through the belt 21 to the pulleys 22 and 24 that are fixed on the rotational drum 23. The pulley 24 transmits the driving force through belt 25 to the pulleys 26 and 28 that are fixed on the rotational axis 27, and the pulley 28 transmits the driving force through the belt 29 to the rotational axis 31 fixed on the pulley 30, and to the robot hand 5 fixed on said axis 31, thereby rotating the robot hand 5.

As described above, the first and third arms 2 and 4 are rotated by the rotational driving force from the arm rotation motor 8, the second arm 3 is rotated by the rotational driving force from the arm extension motor 6, and the robot hand 5 is rotated by the rotational driving force from the robot hand rotational motor 7. Thus, every rotational driving source is mounted in a stationary part of the base 1. Consequently, the rotational driving force can be transmitted to each of arms without routing electric lines for supplying electric power through the arms as moving parts.

Figure 3:
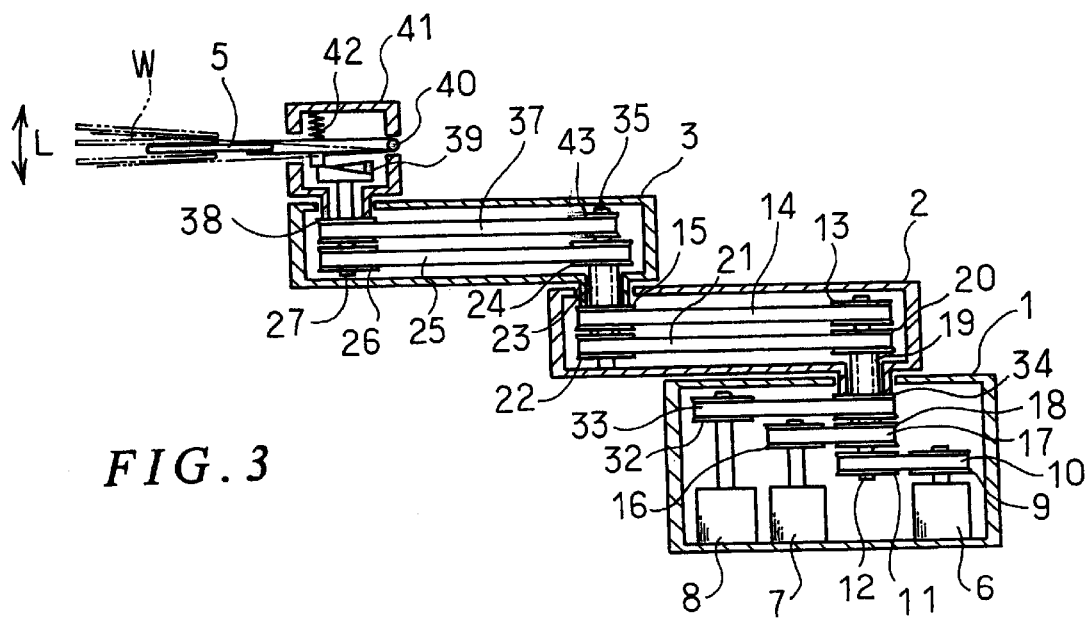
FIG. 3 is a side-sectional view of a robot according to a second embodiment of the present invention.

FIG. 3 is a side-sectional view of a robot according to the second embodiment of the present invention. The second embodiment makes it possible to tilt the robot hand. The robot has an arm structure wherein three arms of the first, second and third arms 2, 3 and 41 are sequentially attached from the base 1 that includes a rotational driving source in a stationary part, and a robot hand for holding a wafer W is connected in a distal end portion of the third arm 41. The rotational driving force from the arm rotation motor 8 in the base 1 is transmitted through the pulley 32 fixed on the output axis of said motor 8 and through the belt 33, to the first arm 2 that is fixed to the pulley 34, thereby rotating the first arm 2. Then, said driving force is transmitted through the stationary axis 35 fixed to the first arm 2, the pulley 43 fixed on said axis 35, and the belt 37, to the third arm 41 that is fixed to the pulley 38 diameter of which has a ratio of 1:2 to that of the pulley 43, thereby rotating the third arm 41. Since the third arm 41 is connected to the first arm 2 at a ratio of 1:2, the rotational amount of the third arm 41 always maintains half of the angle that is formed between the first and second arms 2 and 3.

The rotational driving force from the arm extension motor 6 in the base 1 is transmitted through the pulley 9 fixed on the output axis of said motor 6 and through the belt 10, to the pulleys 11 and 13 that are fixed on the rotational axis 12. Said driving force is transmitted through the pulley 13 and belt 14, to the second arm 3 that is fixed to the pulley 15, thereby rotating the second arm 3.

The rotational driving force from the robot hand rotation motor 7 in the base 1 is transmitted through the pulley 16 fixed on the output axis of said motor 7 and through the belt 17, to the pulleys 18 and 20 that are fixed on the rotational drum 19. The pulley 20 transmits the driving force through the belt 21 to the pulleys 22 and 24 that are fixed on the rotational drum 23. The pulley 24 transmits the driving force through the belt 25 to the pulley 26 and a cam 39 that are fixed on the rotational axis 27. The cam 39 has a construction, which can convert rotational motions into up-and-down motions, transmits the driving force to the robot hand 5 that is sandwiched between the cam 39 fixed on the axis 40, and a spring 42. The rotation of the cam 39 provides tilt motions to the robot hand 5 in an up-and-down direction shown by a center line L through the axis 40.

The first and second arms 2 and 3 are approximately equal in length. In order to provide the robot hand 5 with linear motions and rotational motions about a connecting part between the base 1 and the first arm 2, a controller (not shown in the figures) controls the arm extension motor 6 and arm rotation motor 8. The robot hand 5 is given the up-and-down motions by controlling the robot hand rotation motor 7.

Figure 4:
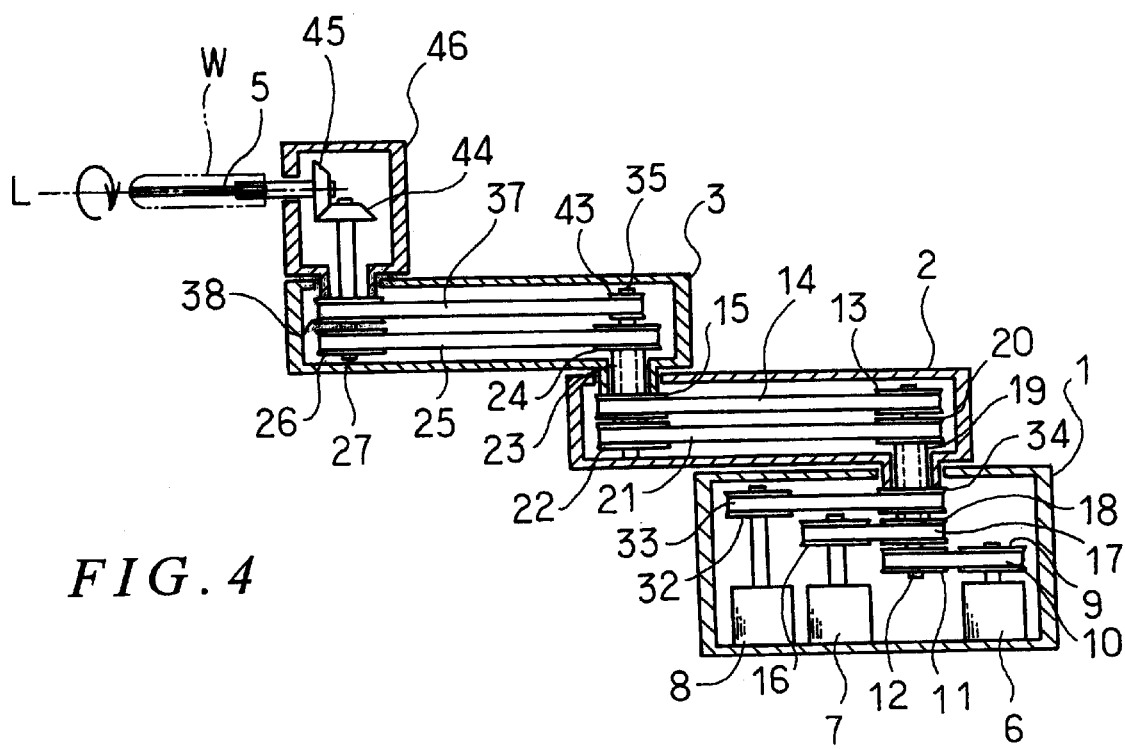
FIG. 4 is a side-sectional view of a robot according to a third embodiment of the present invention.
Figure 5:
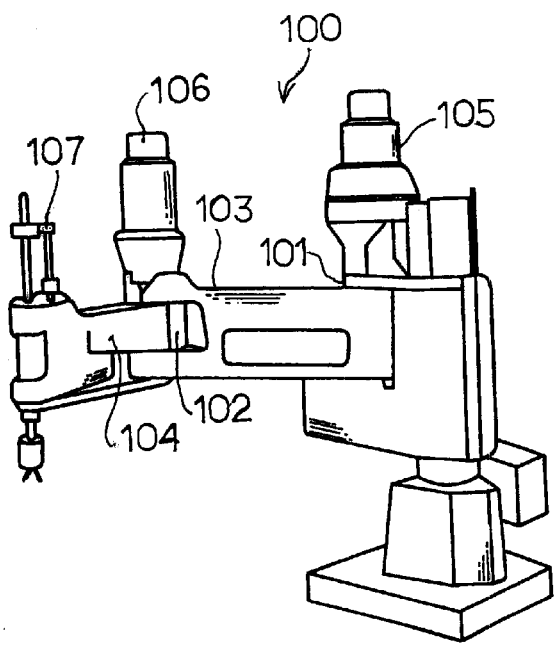
FIG. 5 is a perspective view of a conventional horizontal multi-joint industrial robot.

FIG. 4 is a side sectional view showing a robot according to the third embodiment of the present invention. This embodiment makes it possible to rotate the robot hand around an axis of a horizontal direction. The robot has an arm structure in which three arms of the first, second and third arms 2, 3 and 46 are sequentially attached from the base 1 that includes a rotational driving source in a stationary part, and the robot hand 5 for holding a wafer W is connected in a distal end portion of the third arm 46. The rotational driving force from the arm rotation motor 8 in the base 1 is transmitted through the pulley 32 fixed on the output axis of said motor 8 and through the belt 33, to the first arm 2 that is fixed to the pulley 34, thereby rotating the first arm 2. Then, said driving force is transmitted through the stationary axis 35 fixed to the first arm 2, the pulley 43 fixed on said axis 35, and the belt 37, to the third arm 46 that is fixed to the pulley 38 diameter of which has a ratio of 1:2 to that of the pulley 43, thereby rotating the third arm 46. Since the third arm 46 is connected to the first arm 2 at a ratio of 1:2, the rotational amount of the third arm 46 always maintains half of the angle that is formed between the first and second arms 2 and 3.

The rotational driving force from the arm extension motor 6 in the base 1 is transmitted through the pulley 9 fixed on the output axis of said motor 6 and through the belt 10, to the pulleys 11 and 13 that are fixed on the stationary axis 12. Said driving force is transmitted through the pulley 13 and belt 14 to the second arm 3 that is fixed to the pulley 15, thereby rotating the second arm 3.

The rotational driving force from the robot hand rotation motor 7 in the base 1 is transmitted through the pulley 16 fixed on the output axis of said motor 7 and through the belt 17, to the pulleys 18 and 20 that are fixed on the rotational drum 19. The pulley 20 transmits the driving force through the belt 21 to the pulleys 22 and 24 that are fixed on the rotational drum 23. The pulley 24 transmits the driving force through the belt 25 to the pulley 26 and a bevel gear 44 that are fixed on the rotational axis 27, thereby rotating the gear 44. The bevel gears 44 and 45 intersect each other in an orthogonal angle direction. The robot hand 5 fixed on the bevel gear 45 makes rotational motions on the center line L around an axis of a horizontal direction.

The first and second arms 2 and 3 are approximately equal in length. In order to provide the robot hand 5 with linear motions and rotational motions about a connecting part between the base 1 and the first arm 2, a controller (not shown in the figures) controls the arm extension motor 6 and arm rotation motor 8. The robot hand 5 is given the rotational motions by controlling the robot hand rotation motor 7.

In the above-described embodiments, the belts and pulleys are employed as the driving force transmitting mechanisms. In case that dust is raised by the belts and pulleys sliding, cleanliness in movement space of the robot can be heightened by exhausting air from the base under suction, which makes proper circumstances for producing semiconductors.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, not limited to the pulley 43 that is fixed on the stationary axis 35, and diameter of which is half of that of the pulley 38 as employed in the second and third embodiments, the pulley diameter of which is same as that of the pulley 38, can also be employed according to work environments.

What is claimed is:

1. A horizontal multi-joint industrial robot, comprising:
   a base;
   arms sequentially pivotally attached to one another, a proximal end portion of a lowest one of said arms being rotatably supported by said base about a primary axis of rotation;
   a robot hand rotatably supported by a distal end portion of a highest one of said arms, said distal end portion being movable at least along a curved path which passes through said primary axis;
   a rotational driving source contained in said base including motors for rotatably driving said arms and said robot hand, said motors including a robot hand rotation motor; and
   a driving force transmitting mechanism for transmitting rotational driving force from said rotational driving source to the arms and the robot hand, respective portions of said driving force transmitting mechanism being provided in each of the arms and connecting parts of the arms, said driving force transmitting mechanism being operable to impart rotation to said robot hand by transmission of driving force from said robot hand rotation motor independent of rotational motion transmitted to the arms by said driving force transmitting mechanism.

2. The horizontal multi-joint industrial robot as claimed in claim 1, wherein said driving force transmitting mechanism includes a rotational mechanism for rotating said robot hand around a connecting part of the distal end portion of the highest arm.

3. The horizontal multi-joint industrial robot as claimed in claim 1, wherein said driving force transmitting mechanism includes a mechanism for supporting said robot hand so as to move in a seesaw manner in the distal end portion of the highest arm, and giving tilting motions to said robot hand.

4. The horizontal multi-joint industrial robot as claimed in claim 1, wherein said driving force transmitting mechanism includes a mechanism for supporting said robot hand so as to enable said robot hand to rotationally move around a horizontal axis in the distal end portion of the highest arm, and for imparting rotational movement around the horizontal axis to said robot hand.

5. The horizontal multi-joint industrial robot as claimed in claim 1, wherein:
   said arms are sequentially attached from the base in order of first, second and third arms;
   said motors further include an arm rotation motor for rotating said first and third arms and an arm extension motor for rotating said second arm; and
   said driving force transmitting mechanism being further operable to impart rotation to said first and third arms by independent transmission of driving force from said arm rotation motor, and to impart rotation to said second arm by independent transmission of driving force from said arm extension motor.

6. The horizontal multi-joint industrial robot as claimed in claim 2, wherein:
   said arms are sequentially attached from the base in order of first, second and third arms;
   said motors further include an arm rotation motor for rotating said first and third arms and an arm extension motor for rotating said second arm; and
   said driving force transmitting mechanism being further operable to impart rotation to said first and third arms by independent transmission of driving force from said arm rotation motor, and to impart rotation to said second arm by independent transmission of driving force from said arm extension motor.

7. The horizontal multi-joint industrial robot as claimed in claim 3, wherein:
   said arms are sequentially attached from the base- in order of first, second and third arms;
   said motors further include an arm rotation motor for rotating said first and third arms and an arm extension motor for rotating said second arm; and
   said driving force transmitting mechanism being further operable to impart rotation to said first and third arms by independent transmission of driving force from said arm rotation motor, and to impart rotation to said second arm by independent transmission of driving force from said arm extension motor.

8. The horizontal multi-joint industrial robot as claimed in claim 4, wherein:
   said arms are sequentially attached from the base in order of first, second and third arms;
   said motors further include an arm rotation motor for rotating said first and third arms and an arm extension motor for rotating said second arm; and
   said driving force transmitting mechanism being further operable to impart rotation to said first and third arms by independent transmission of driving force from said arm rotation motor, and to impart rotation to said second arm by independent transmission of driving force from said arm extension motor.

9. The horizontal multi-joint industrial robot as claimed in claim 5, wherein said driving force transmitting mechanism further comprises axes passing through each of the connecting parts of said arms, pulleys that are fixed on said axes, and belts that are looped between pulleys of proximal end portions and distal end portions of the arms.

10. The horizontal multi-joint industrial robot as claimed in claim 6, wherein said driving force transmitting mechanism further comprises axes passing through each of the connecting parts of said arms, pulleys that are fixed on said axes, and belts that are looped between pulleys of proximal end portions and distal end portions of the arms.

11. The horizontal multi-joint industrial robot as claimed in claim 7, wherein said driving force transmitting mechanism further comprises axes passing through each of the connecting parts of said arms, pulleys that are fixed on said axes, and belts that are looped between pulleys of proximal end portions and distal end portions of the arms.

12. The horizontal multi-joint industrial robot as claimed in claim 8, wherein said driving force transmitting mechanism further comprises axes passing through each of the connecting parts of said arms, pulleys that are fixed on said axes, and belts that are looped between pulleys of proximal end portions and distal end portions of the arms.

13. A horizontal multi-joint industrial robot, comprising:
   a base;
   a first arm, a second arm and a third arm which are sequentially pivotally attached, a proximal end portion of the first arm and a robot hand are pivotally supported in the base and a distal end portion of the third arm, respectively;
   an arm rotation motor for driving said first and third arms to rotate, an arm extension motor for driving the second arm to rotate, and a robot hand rotation motor for driving the robot hand to rotate, each of said motors being contained in the base;
   an arm rotation driving force transmitting mechanism for independently transmitting rotational driving force from said arm rotation motor to said first and third arms, an arm extension driving force transmitting mechanism for independently transmitting rotational driving force from said arm extension motor to said second arm, and a robot hand rotation driving force transmitting mechanism for independently transmitting rotation driving force from said robot hand rotation motor to said robot hand, respective portions of each of said arm rotation driving force transmitting mechanism, said arm extension driving force transmitting mechanism and said robot hand rotation driving force transmitting mechanism being equipped in each of the arms and connecting parts of the arms;
   said arm rotation driving force transmitting mechanism including a first pulley which is fixed on an output axis of said arm rotation motor, a second pulley which is fixed on the proximal end portion of said first arm, a first belt which is looped between said first and second pulleys, a third pulley which is fixed on the distal end portion of said first arm, and fixed on an upper part of a stationary axis being toward an inside of the second arm through a connecting part between the first and second arms, a fourth pulley fixed on the proximal end portion of said third arm, and a second belt that is looped between said third and fourth pulleys;
   said arm extension driving force transmitting mechanism including a fifth pulley that is fixed on an output axis of said arm extension motor, sixth and seventh pulleys that are fixed respectively on upper and lower ends of a rotational axis passing through a proximal end portion of said first arm and being rotatably fixed in said proximal end portion of said first arm, an eighth pulley that is fixed on a proximal end portion of said second arm, a third belt that is looped between said fifth and seventh pulleys, and a fourth belt that is looped between said sixth and eighth pulleys; and said robot hand rotation driving force transmitting mechanism including a ninth pulley that is fixed on an output axis of said robot hand rotation motor, tenth and eleventh pulleys that are respectively fixed on upper and lower ends of a drum passing through the proximal end portion of said first arm and being rotatably supported by said proximal end portion, said third pulley and a twelfth pulley that are fixed on upper and lower ends of a drum rotatably supported by said stationary axis, thirteenth and fourteenth pulleys that are fixed on upper and lower ends of a rotational axis rotatably supported by the proximal end portion of said third arm, a fifteenth pulley that is fixed on a lower end of a rotational axis rotatably supported by a distal end portion of said third arm, said robot hand that is fixed on an upper end of the rotational axis, a fifth belt that is looped between said ninth and eleventh pulleys, a sixth belt that is looped between said tenth and twelfth pulleys, a seventh belt that is looped between said fourteenth pulley and a sixteenth pulley, and an eight belt that is looped between said thirteenth and fifteenth pulleys.

* * * * *